March 17, 1931. H. E. CANN 1,797,128

LIQUID COOLER

Filed Jan. 18, 1930

Harry E. Cann, Inventor

By Horace C. Chandler

Attorney

Patented Mar. 17, 1931

1,797,128

UNITED STATES PATENT OFFICE

HARRY E. CANN, OF WEST CHESTER, PENNSYLVANIA

LIQUID COOLER

Application filed January 18, 1930. Serial No. 421,849.

This invention relates to new and useful improvements in cooling devices, and particularly to devices for cooling and aerating milk.

The present invention is especially designed for use in connection with a milk cabinet, wherein the cooling agent is brine, or the like, so that the same cooling agent used in the cabinet may be used to cool milk outside of the cabinet.

It has been found that, when the cooling agent is pumped from the bottom of the cabinet to the cooler, and returned at the top of the cabinet, such agent is too cold, and has a tendency to freeze the milk as it flows over the cooler.

The particular, and principal object of the present invention is to provide a device wherein this objectionable feature is overcome, and the cooling agent, used in said cooler, maintained at a temperature much higher than that used to cool the milk in the cabinet.

Other objects and advantages will be apparent from the following description, when taken in connection with the accompanying drawing.

Figure 1:
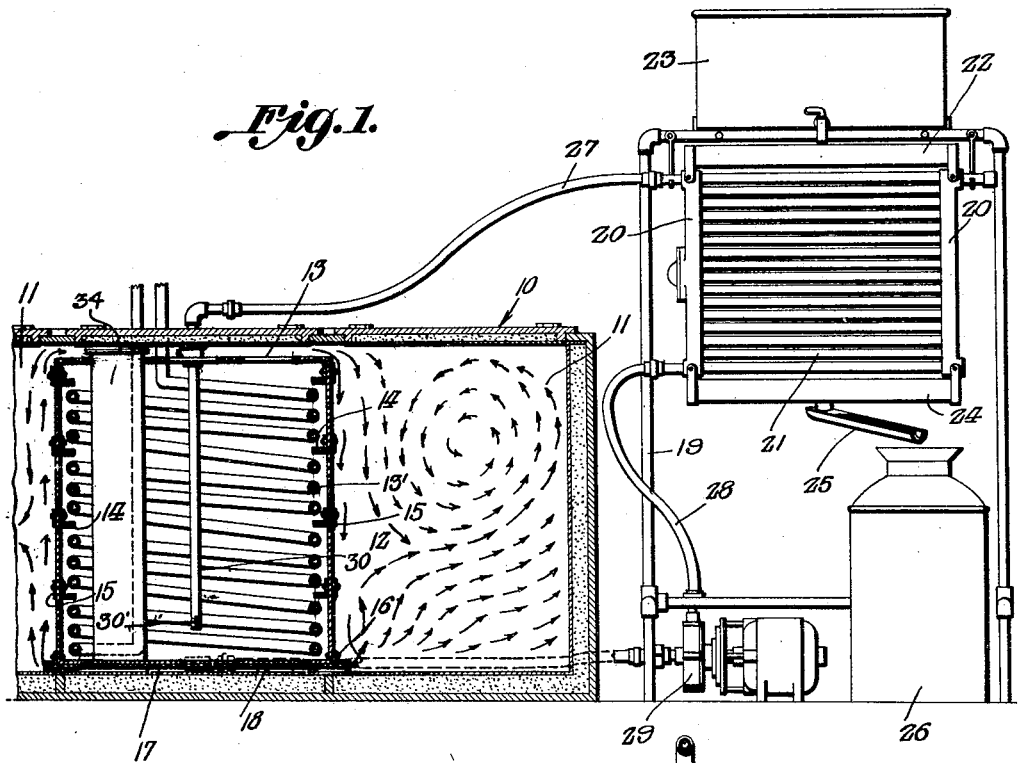
Figure 1 is a view of a portion of a milk cooling cabinet and a cooler associated therewith, the cabinet being in section.
Figure 2:
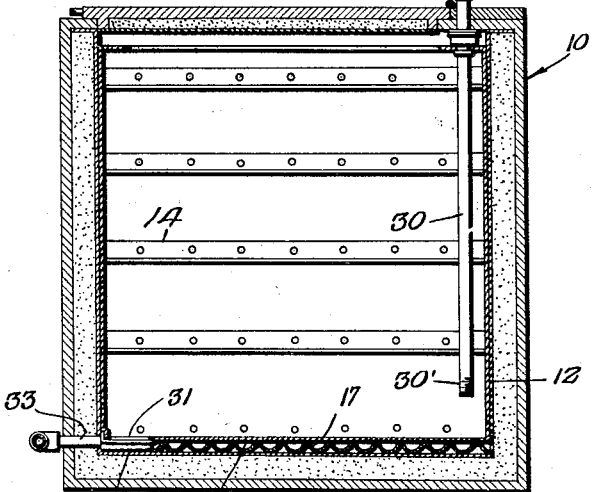
Figure 2 is an enlarged vertical sectional view through the cabinet and brine tank.

Referring particularly to the accompanying drawing, 10 represents a cooling cabinet, having the end compartments 11, which are formed by the side walls of the brine tank 13 located centrally within the cabinet, the front and rear walls 12, of such tank, contacting with the front and rear walls of the cabinet, as clearly seen in the sectional view Figure 2, of the drawing. The side walls of the brine tank have the angle strips 14 secured to their inner faces, and the bracing strips 15 secured to their outer faces, at corresponding positions, and with the same fastening means. Secured to the lower portions of the outer faces of the sides of the brine tank are the angle strips 16. Secured to the bottom of the brine tank 13, and to the horizontal flanges of the strips 16, is a sheet of corrugated metal 17, which provides the passages 18, beneath the tank, for the air, so that a good circulation may be had between the compartments, and around the brine tank, whereby to more efficiently cool the bottles of milk located in the compartments 11. It will be noted that the upper end of the brine tank is spaced from the top of the cabinet, whereby to permit passage of the air thereover, in the circulation of such air. This air circulation is clearly indicated by the arrows in Figure 1. Extending around the interior of the brine tank 13 is a pipe coil 13', through which is pumped a gas for chilling the brine in the tank. The tank is adapted to receive tanks 34, filled with clear water to be frozen.

Disposed adjacent the cabinet is a support 19, and carried by this support is the cooler. The cooler includes spaced casings 20, between which extend, and to which are connected, the series of horizontal brine conveying pipes 21, such pipes being so connected with the casings as to permit a circuitous flow of brine. At the upper end of the series of pipes is a transverse trough 22, having a perforated bottom, and above this trough, in position to discharge thereinto, is a milk receptacle 23. At the lower end of the series of pipes 21 is a second trough 24, such trough having an imperforate bottom, and having connected therewith a discharge spout 25, which discharges into a suitable receptacle placed thereunder, as shown at 26, in Figure 1, of the drawing. Connected to the upper end of one of the end casings 20 is a conduit 27, while a similar conduit 28 is connected to the lower end of said casing, the other end of the latter conduit being connected with the motor operated pump 29. Disposed vertically through the rear portion of the top of the cabinet, is a pipe 30, the lower end of which is disposed in such relation to the bottom of the brine tank, as will be more particularly described later herein. The other end of the conduit 27 is connected with the outer end of this vertical pipe 30, as is clearly seen in the drawing. Formed in the bottom of the brine tank 13, adjacent the rear wall of the cabinet, is an elongated opening 31, and secured to the lower face of said tank bottom is a semi-cup-shaped member 32, the outer end of which has a nipple 33 which extends through the end of the cabinet, and is properly connected with the before-mentioned pump 29.

It will be noted that the lower end of the pipe 30 is disposed in comparatively close proximity to the bottom of the tank, and to the outlet opening 31, whereby the cooling agent, which is delivered back into the tank, through the pipe 30, will be discharged near said outlet, with the result that such returned agent will not be greatly lowered in temperature, when again drawn out through the opening 31, by the pump. Thus the brine circulated through the cooler cannot become greatly lowered in temperature, due to the fact that the brine returned from the cooler is passed quickly through the pipe 30, to a point near the bottom of the brine tank, and in close proximity to the outlet opening, whereby as the returned warmer brine is quickly withdrawn through the outlet, by the pump, a heat transfer takes place between such warmer brine and the colder brine, at the bottom of the tank, so that the temperature of such withdrawn brine will be considerably higher than that of the tank, with the result that the brine of the cabinet can be used in the cooler, but without the disadvantage of lowering the temperature of the milk to the freezing point. It will be noted that the lower end of the pipe 30 is externally threaded, as shown at 30', such threads being provided for the purpose of connecting additional pipe sections, when it is desired to have the brine delivered in closer proximity to the outlet opening, than that shown in the drawing.

Attention is particularly directed to the arrows in Figure 1, which represent the courses of the air currents within the cabinet. It will be noted that the coldest currents pass beneath the brine tank 13, and upon rising a short distance within the end compartments of the cabinet, are met by the falling currents which have passed over the top of the tank. These falling currents join with the rising currents from the bottom, and circulate within and between the compartments, and over and under the brine tank.

What is claimed is:

1. The combination with a receptacle containing a cooling agent, and a cooler associated therewith, of means for circulating the cooling agent between the receptacle and the cooler, and means within the receptacle for maintaining the cooling agent which passes through the cooler at a temperature above that of the cooling agent within the receptacle.

2. The combination with a receptacle containing a cooling agent, and a cooler associated therewith, the container having an inlet and an outlet, and a circulating means between the receptacle and the cooler connected with said inlet and outlet, said inlet being disposed in such relation to the outlet as to prevent any great reduction in the temperature of the circulated agent while passing from the inlet to the outlet, through the agent in the receptacle.

3. The combination with a receptacle containing a cooling agent at a temperature below that of the freezing point and a cooler associated therewith, connections between the receptacle and the cooler including a pump, and connections between the receptacle and the cooler including a pipe extending into the agent within the receptacle and terminating in proximity to the outlet of the receptacle, whereby to maintain the circulating agent at a temperature above the freezing point.

In testimony whereof, I affix my signature.

HARRY E. CANN.